US012304793B2

(12) United States Patent
Wang

(10) Patent No.: US 12,304,793 B2
(45) Date of Patent: May 20, 2025

(54) GAS-LIQUID MIXTURE FILLING DEVICE AND GAS-LIQUID MIXTURE FILLING METHOD

(71) Applicant: Chih-Meng Wang, Taichung (TW)

(72) Inventor: Chih-Meng Wang, Taichung (TW)

( * ) Notice: Subject to any disclaimer, the term of this patent is extended or adjusted under 35 U.S.C. 154(b) by 54 days.

(21) Appl. No.: 18/251,903

(22) PCT Filed: Jan. 28, 2021

(86) PCT No.: PCT/CN2021/074076
§ 371 (c)(1),
(2) Date: May 5, 2023

(87) PCT Pub. No.: WO2022/160154
PCT Pub. Date: Aug. 4, 2022

(65) Prior Publication Data
US 2023/0416066 A1 Dec. 28, 2023

(51) Int. Cl.
*B67C 3/04* (2006.01)
*B67C 3/22* (2006.01)

(52) U.S. Cl.
CPC ................ *B67C 3/04* (2013.01); *B67C 3/225* (2013.01)

(58) Field of Classification Search
CPC ................................. B67C 3/04; B67C 3/225
USPC ............................................................ 141/4
See application file for complete search history.

(56) References Cited

U.S. PATENT DOCUMENTS 4,369,047 A * 1/1983 Arscott ..................... B04C 5/04 210/512.3
5,090,971 A * 2/1992 Barbier ................. A23L 3/3418 95/255
6,742,772 B2 * 6/2004 Kiefer ................. B01F 33/5014 426/477
2018/0020700 A1 * 1/2018 Lucas ....................... A23L 2/76 426/487

FOREIGN PATENT DOCUMENTS

| | | | |
|---|---|---|---|
| CN | 2234816 | Y | 9/1996 |
| CN | 1984589 | A | 6/2007 |
| CN | 104759229 | A | 7/2015 |
| CN | 206508824 | U | 9/2017 |
| JP | 2011183350 | A | 9/2011 |
| TW | 605074 | U | 12/2020 |
| WO | 2017042148 | A1 | 3/2017 |

* cited by examiner

*Primary Examiner* — Craig M Schneider
*Assistant Examiner* — Christopher M Afful
(74) *Attorney, Agent, or Firm* — MUNCY, GEISSLER, OLDS & LOWE, P.C.

(57) ABSTRACT

The present invention relates to a gas-liquid mixture filling device and a gas-liquid mixture filling method. The gas-liquid mixture filling device includes a tank and a filling body. The tank defines a first gas chamber and a first liquid mixing space. The filling body comprises an accommodating chamber and a plurality of pouring ports, the accommodating chamber defines a second gas chamber and a second liquid mixing space, and the plurality of pouring ports are communicated with the second liquid mixing space. A first pipeline is communicated with the first gas chamber and the second gas chamber. A second pipeline is communicated with the first liquid mixing space and the second liquid mixing space.

7 Claims, 2 Drawing Sheets

GAS-LIQUID MIXTURE FILLING DEVICE AND GAS-LIQUID MIXTURE FILLING METHOD

BACKGROUND OF THE INVENTION

Field of the Invention

The present invention relates to a gas-liquid mixture filling device and a gas-liquid mixture filling method.

Description of the Prior Art

Gas can dissolve in the liquid, so that carbonated drinks or other mixed liquids with a large amount of gas dissolved in it can be produced. The lower the temperature of the liquid is, the lower the escape ability of gas from the liquid is. As such, the filling of a gas-liquid mixture into a container is generally carried out under a low temperature condition, and this will consume a lot of energy due to keeping the process at low temperature. If the filling of a gas-liquid mixture into a container is carried out at room temperature (relatively higher temperature), gas in the gas-liquid mixture in the tank will be released in large quantities from the gas-liquid mixture. As a result, the tank needs significantly large height, width and volume to ensure that there is sufficient space for accommodating the gas released and the gas-liquid mixture, which results in a large size and high cost of the tank and a large space for installation of the equipment for the gas-liquid mixture filling process.

The present invention is, therefore, arisen to obviate or at least mitigate the above-mentioned disadvantages.

SUMMARY OF THE INVENTION

The main object of the present invention is to provide a gas-liquid mixture filling device, which provides a high filling volume without increasing the height and volume of a filling body.

Another object of the present invention is to provide a gas-liquid mixture filling method.

To achieve the above and other objects, a gas-liquid mixture filling device is provided, including: a tank, defining a first gas chamber and a first liquid mixing space relatively under the first gas chamber; a filling body, including an accommodating chamber and a plurality of pouring ports, the accommodating chamber defining a second gas chamber and a second liquid mixing space relatively under the second gas chamber, the plurality of pouring ports being communicated with the second liquid mixing space, an inner top side of the tank being higher than an inner bottom side of the accommodating chamber; a first pipeline, communicated with the first gas chamber of the tank and the second gas chamber of the accommodating chamber; a second pipeline, communicated with the first liquid mixing space of the tank and the second liquid mixing space of the accommodating chamber.

Specifically, the gas-liquid mixture filling device further includes a mixing container, and the mixing container is configured to receive a gas-liquid mixture, a third pipeline is communicated with and between the mixing container and the tank.

Specifically, a control valve is disposed within the third pipeline, and the control valve is configured to selectively communicate the mixing container and the tank.

Specifically, the first pipeline is communicated with a top end of the tank and a top end of the accommodating chamber.

Specifically, the second gas chamber is communicated with a bottom end of the tank and a bottom end of the accommodating chamber.

Specifically, a height of the tank is defined as a first height, a height of the accommodating chamber is defined as a second height, and the first height is smaller than the second height.

Specifically, the tank has a volume smaller than a volume of the accommodating chamber.

Specifically, the gas-liquid mixture is a carbonated liquid at room temperature.

Specifically, the first pipeline is communicated with a top end of the tank and a top end of the accommodating chamber; the second gas chamber is communicated with a bottom end of the tank and a bottom end of the accommodating chamber; a height of the tank is defined as a first height, a height of the accommodating chamber is defined as a second height, and the first height is smaller than the second height; the tank has a volume smaller than a volume of the accommodating chamber; the gas-liquid mixture is a carbonated liquid at room temperature.

To achieve the above and other objects, a gas-liquid mixture filling method is provided, including steps of: pouring a gas-liquid mixture into a mixing container; transporting the gas-liquid mixture from the mixing container into a tank via a third pipeline so that the tank defines a first gas chamber and a first liquid mixing space relatively under the first gas chamber; communicating the first gas chamber of the tank with a second gas chamber of an accommodating chamber of a filling body via a first pipeline, and communicating the first liquid mixing space of the tank and a second liquid mixing space of the accommodating chamber via a second pipeline, wherein the filling body includes a plurality of pouring ports, the second liquid mixing space is relatively under the second gas chamber, an inner top side of the tank is higher than an inner bottom side of the accommodating chamber; communicating the plurality of pouring ports with the second liquid mixing space so that the liquid in the second liquid mixing space can be poured into a plurality of filled containers via the plurality of pouring ports.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
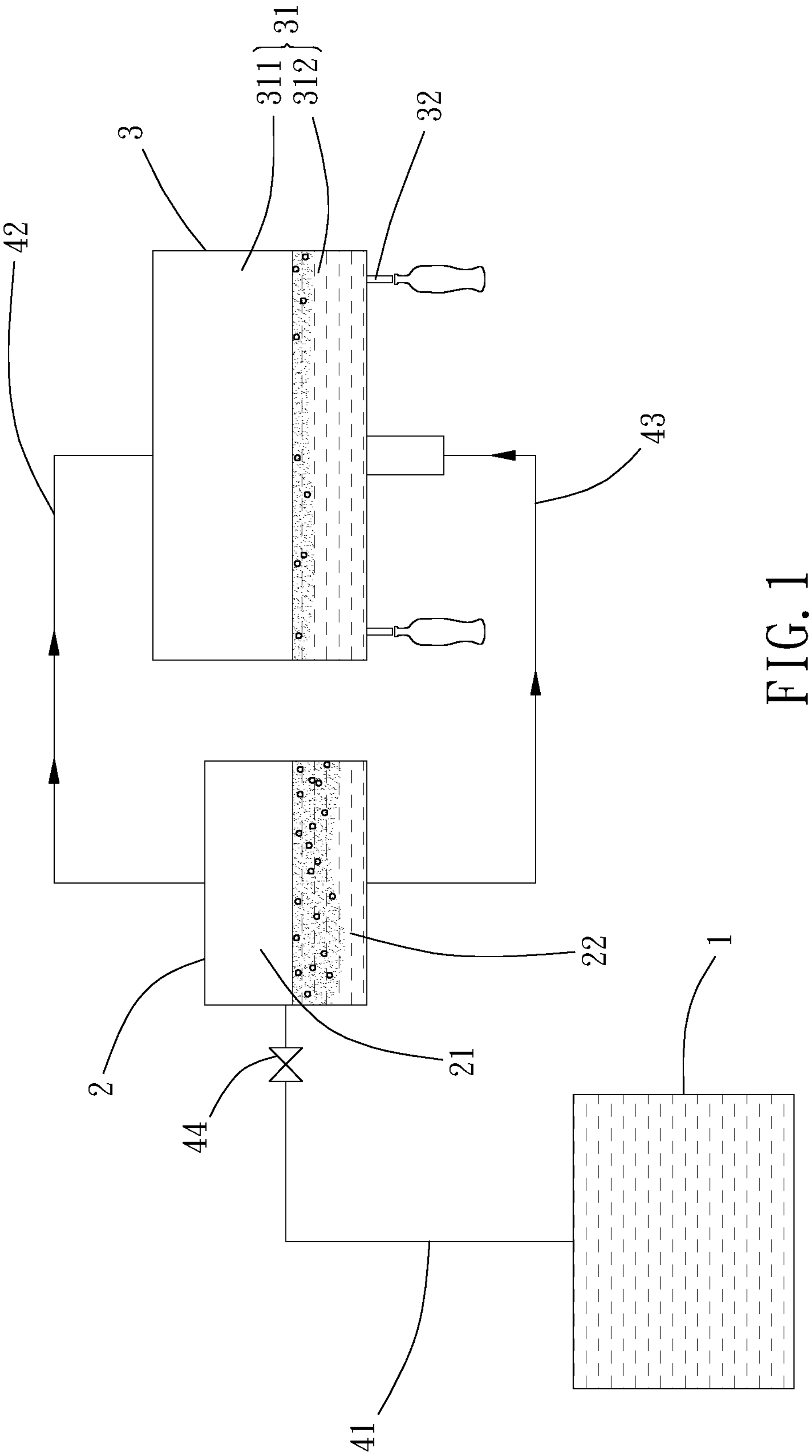
FIGS. 1 and 2 are drawings showing the structural relationship of an exemplary embodiment of the present invention.
Figure 2:
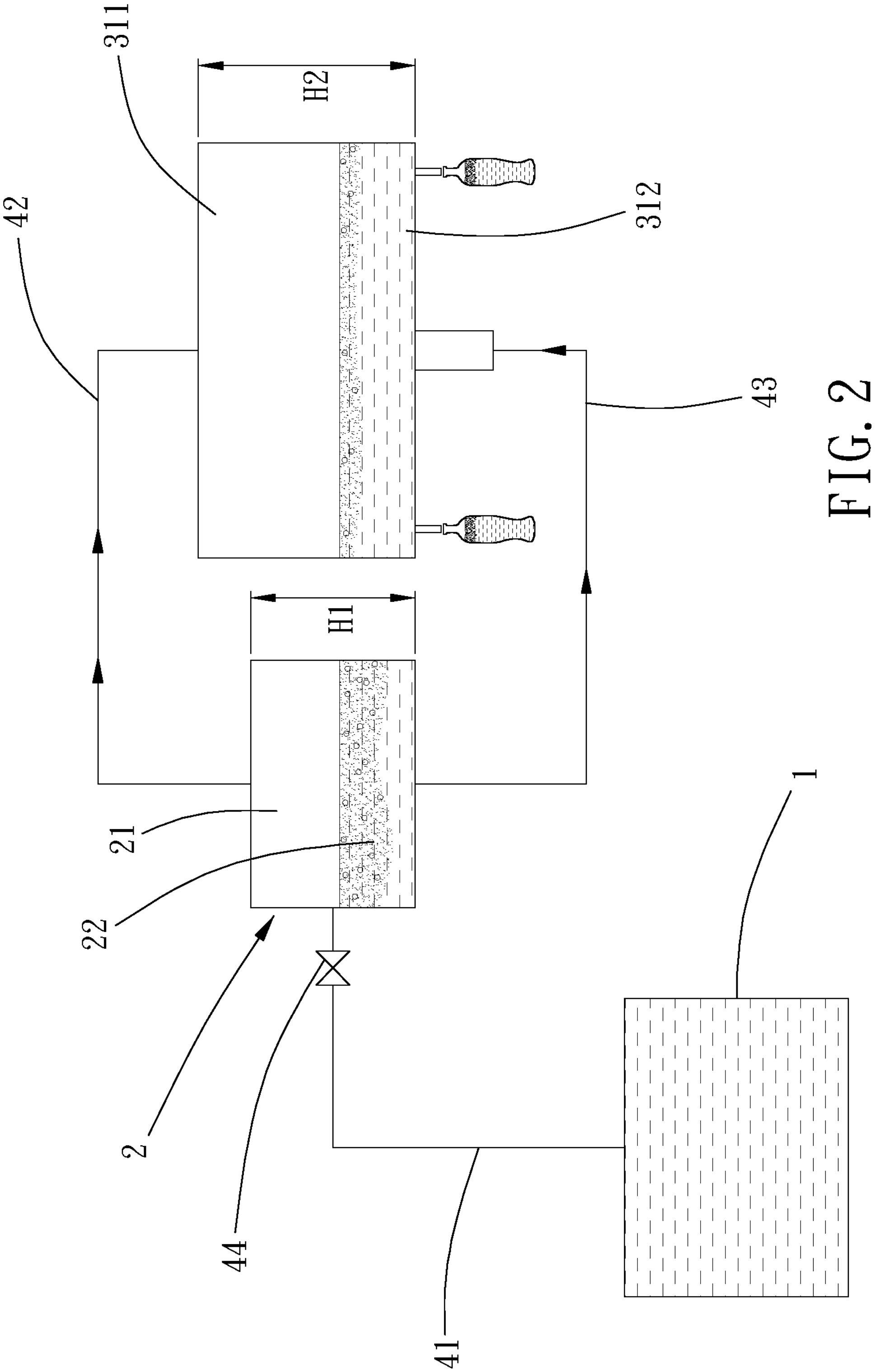

Please refer to FIGS. 1 to 2 for an exemplary embodiment of the present invention. A gas-liquid mixture filling device of the present invention includes a tank 2, a filling body 3, a first pipeline 42 and a second pipeline 43.

The tank 2 defines a first gas chamber 21 and a first liquid mixing space 22 relatively under the first gas chamber 21.

When the gas-liquid mixture flows to the tank 2, some gas in the gas-liquid mixture will comes out to the first gas chamber 21.

The filling body 3 includes an accommodating chamber 31 and a plurality of pouring ports 32, the accommodating chamber 31 defines a second gas chamber 311 and a second liquid mixing space 312 relatively under the second gas chamber 311, and the plurality of pouring ports 32 is communicated with the second liquid mixing space 312. An inner top side of the tank 2 is higher than an inner bottom side of the accommodating chamber 31 so that at least partial interior of the tank 2 and at least partial interior of the accommodating chamber 31 are located at the same level. In this embodiment, the gas-liquid mixture is a carbonated liquid at room temperature.

The first pipeline 42 is communicated with the first gas chamber 21 of the tank 2 and the second gas chamber 311 of the accommodating chamber 31.

The second pipeline 43 is communicated with the first liquid mixing space 22 of the tank 2 and the second liquid mixing space 312 of the accommodating chamber 31.

In this embodiment, the gas-liquid mixture filling device further includes a mixing container 1, the mixing container 1 is configured to receive a gas-liquid mixture, and a third pipeline 41 is communicated with the mixing container 1 and the tank 2. In this embodiment, the gas-liquid mixture is a carbonated drink.

The liquid in the first liquid mixing space 22 can be transported to the second liquid mixing space 312 via the second pipeline 43, and the liquid in the second liquid mixing space 312 can be transported into a plurality of filled containers via the plurality of pouring ports 32. Since the first pipeline 42 is communicated with the first gas chamber 21 and the second gas chamber 311, the interior of the tank 2 and the interior of the accommodating chamber 31 have the same pressure, and the liquid in the first liquid mixing space 22 can flows to the second liquid mixing space 312 via the second pipeline 43. As such, the accommodating chamber 31 can have a small height and small cross-section, thus saving the cost of materials for manufacturing the filling body, and performing fast and mass filling operations.

A control valve 44 is disposed within the third pipeline 41, and control valve 44 is configured to selectively communicate the mixing container 1 and the tank 2, which can control the volume of the gas-liquid mixture in the mixing container 1.

Preferably, the first pipeline 42 is communicated with a top end of the tank 2 and a top end of the accommodating chamber 31, for ensuring that only gas can pass through the first pipeline 42 to balance the pressure in the tank 2 and the accommodating chamber 31.

Preferably, the second pipeline 43 is communicated with the tank 2 a bottom end of and a bottom end of the accommodating chamber 31, for ensuring that only liquid can pass through the second pipeline 43.

A height of the tank 2 is defined as a first height H1, a height of the accommodating chamber 31 is defined as a second height H2, and the first height H1 smaller than the second height H2. The tank 2 has a volume smaller than a volume of the accommodating chamber 31, thus lowering the cost of the tank 2.

The present invent further provides a gas-liquid mixture filling method. The includes steps of: pouring a gas-liquid mixture into a mixing container 1; transporting the gas-liquid mixture from the mixing container 1 into a tank 2 via a third pipeline 41 so that the tank 2 defines a first gas chamber 21 and a first liquid mixing space 22 relatively under the first gas chamber 21; communicating the first gas chamber 21 of the tank 2 with a second gas chamber 311 of an accommodating chamber 31 of a filling body 3 via a first pipeline 42, and communicating the first liquid mixing space 22 of the tank 2 and a second liquid mixing space 312 of the accommodating chamber 31 via a second pipeline 43, wherein the filling body 3 includes a plurality of pouring ports 32, the second liquid mixing space 312 is relatively under the second gas chamber 311, an inner top side of the tank 2 is higher than an inner bottom side of the accommodating chamber 31; communicating the plurality of pouring ports 32 with the second liquid mixing space 312 so that the liquid in the second liquid mixing space 312 can be poured into a plurality of filled containers via the plurality of pouring ports 32.

In sum, since the first pipeline is communicated with the first gas chamber and the second gas chamber, the interior of the tank and the interior of the accommodating chamber have the same pressure, the liquid in the first liquid mixing space can flows to the second liquid mixing space via the second pipeline. As such, the accommodating chamber 31 can have a small height and small cross-section, thus saving the cost of materials for manufacturing the filling body, and performing fast and mass filling operations.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A gas-liquid mixture filling device, including:

a tank, defining a first gas chamber and a first liquid mixing space relatively under the first gas chamber;

a filling body, including an accommodating chamber and a plurality of pouring ports, the accommodating chamber defining a second gas chamber and a second liquid mixing space relatively under the second gas chamber, the plurality of pouring ports being communicated with the second liquid mixing space, an inner top side of the tank being higher than an inner bottom side of the accommodating chamber;

a first pipeline, communicated with the first gas chamber of the tank and the second gas chamber of the accommodating chamber;

a second pipeline, communicated with the first liquid mixing space of the tank and the second liquid mixing space of the accommodating chamber;

wherein the tank has a volume smaller than a volume of the accommodating chamber.

2. The gas-liquid mixture filling device of claim 1, wherein the gas-liquid mixture is a carbonated liquid at room temperature.

3. The gas-liquid mixture filling device of claim 1, wherein the first pipeline is communicated with a top end of the tank and a top end of the accommodating chamber; the second gas chamber is communicated with a bottom end of the tank and a bottom end of the accommodating chamber; a height of the tank is defined as a first height, a height of the accommodating chamber is defined as a second height, and the first height is smaller than the second height; the gas-liquid mixture is a carbonated liquid at room temperature.

4. The gas-liquid mixture filling device of claim 1, further including a mixing container, wherein the mixing container is configured to receive a gas-liquid mixture, a third pipeline is communicated with and between the mixing container and the tank, and a control valve is disposed within the third pipeline, and the control valve is configured to selectively communicate the mixing container and the tank.

5. The gas-liquid mixture filling device of claim 1, wherein the first pipeline is communicated with a top end of the tank and a top end of the accommodating chamber.

6. The gas-liquid mixture filling device of claim 1, wherein the second gas chamber is communicated with a bottom end of the tank and a bottom end of the accommodating chamber.

7. The gas-liquid mixture filling device of claim 1, wherein a height of the tank is defined as a first height, a height of the accommodating chamber is defined as a second height, and the first height is smaller than the second height.

* * * * *